United States Patent
McPartland

(10) Patent No.: US 9,899,820 B1
(45) Date of Patent: Feb. 20, 2018

(54) WALL PLATE

(71) Applicant: Sean Michael McPartland, Claridge, PA (US)

(72) Inventor: Sean Michael McPartland, Claridge, PA (US)

( * ) Notice: Subject to any disclaimer, the term of this patent is extended or adjusted under 35 U.S.C. 154(b) by 742 days.

(21) Appl. No.: 14/271,630

(22) Filed: May 29, 2014

(51) Int. Cl.
| | |
|---|---|
| *H02G 3/14* | (2006.01) |
| *H02G 3/22* | (2006.01) |
| *E04B 1/00* | (2006.01) |
| *E04C 2/52* | (2006.01) |

(52) U.S. Cl.
CPC ............ *H02G 3/22* (2013.01); *E04B 1/0023* (2013.01); *E04C 2/52* (2013.01)

(58) Field of Classification Search
CPC ............... H02G 3/14; H02G 3/22; H05K 5/03
USPC ............. 52/220.8; 174/66, 67; 220/241, 242
See application file for complete search history.

(56) References Cited

U.S. PATENT DOCUMENTS

| | | | | |
|---|---|---|---|---|
| 3,312,770 A * | 4/1967 | McKenna et al. | ............ | 174/503 |
| 4,688,747 A * | 8/1987 | Helmsdorfer et al. | ......... | 248/56 |
| 5,664,955 A * | 9/1997 | Arnett | ........................... | 439/135 |
| 6,184,468 B1 * | 2/2001 | Speziale | .......................... | 174/66 |
| 6,207,894 B1 * | 3/2001 | Reiker | ............................ | 174/503 |
| D503,156 S * | 3/2005 | Provenzano | ................. | D13/156 |
| 7,305,801 B2 * | 12/2007 | Gilleran | ......................... | 52/220.8 |
| 7,389,616 B2 * | 6/2008 | Gilleran | ........................ | 52/220.8 |
| 7,390,964 B2 | 6/2008 | Gorin et al. | | |
| 7,554,036 B1 * | 6/2009 | DeCosta | .......................... | 174/66 |
| 7,563,979 B1 * | 7/2009 | Gretz | ................................ | 174/66 |
| 7,640,699 B2 * | 1/2010 | Gilleran | ........................ | 52/220.1 |
| 7,654,405 B2 * | 2/2010 | Provenzano et al. | ......... | 220/241 |
| 7,669,371 B2 * | 3/2010 | Hill | ................................. | 52/220.1 |
| 7,834,267 B1 * | 11/2010 | Gretz | ............................... | 174/66 |
| 7,847,190 B1 * | 12/2010 | Gretz | ............................... | 174/66 |
| 7,897,870 B1 * | 3/2011 | Gretz | ............................... | 174/58 |
| 8,026,443 B1 * | 9/2011 | Czarnecki | ....................... | 174/66 |
| 8,376,171 B2 * | 2/2013 | Provenzano et al. | ......... | 220/242 |
| 8,404,973 B1 * | 3/2013 | Gretz | ............................... | 174/66 |
| 8,490,815 B2 * | 7/2013 | Provenzano et al. | ......... | 220/241 |
| 8,563,876 B1 * | 10/2013 | Gretz | ............................. | 174/559 |
| 8,584,895 B1 * | 11/2013 | Cleghorn et al. | ............. | 220/844 |
| 8,853,534 B2 * | 10/2014 | Wang | ............................... | 174/66 |
| 2007/0187129 A1 * | 8/2007 | Gorin et al. | ..................... | 174/67 |
| 2007/0235205 A9 * | 10/2007 | Lindenstraus et al. | ......... | 174/66 |
| 2011/0186326 A1 * | 8/2011 | Wang | ............................... | 174/66 |

* cited by examiner

*Primary Examiner* — Gisele D Ford

(57) ABSTRACT

A wall plate is provided that has a scoop and at least one knockout provided on a surface of the scoop. The scoop allows for conventional routing of wires or cables from behind a wall opening to equipment within a room, while the knockouts increase the versatility of the wall plate by allowing for wires or cables to be selectively routed into or through the scoop.

20 Claims, 5 Drawing Sheets

WALL PLATE

BRIEF SUMMARY

Field of the Invention

The invention concerns a wall plate having a scoop for the passage of wires or cable, and the addition of one or more knockouts for selective routing of wires or cables.

Background of the Invention

Wall plates with scoops are known. U.S. Pat. No. 7,390,964 describes a wall plate with a scoop which allows for cables and/or wires to pass from behind a wall into a room where electronic equipment is housed.

The scoop accommodates various sized cable and wires, such as HDMI cables and the like, which have plugs on their ends which require a large opening in the scoop and wall plate to pass the cable through to the room from behind the wall.

Frequently, the available space behind a wall is minimized. So, during the installation or addition of cables and wires, the scoop may not be positioned in an optimal configuration. Accordingly, the installer may have difficulty routing the wires to the scoop opening, or worse, may not be able to route the cable or wire into the opening because of the position of the scoop opening, or the available space fails to accommodate any more wires or cables through the scoop opening.

The addition of holes by the installer is not recommended. The material of the wall plate and scoop is plastic and non-planer, which suggests the scoop may easily break or the holes may be difficult to form into the non-planar scoop surface.

It is to the above described matters that this invention is directed.

SUMMARY OF THE INVENTION

Briefly, the disclosure sets forth a wall plate for wires or cables to pass therethrough, wherein the wall plate has a scoop with one or more knockouts available for additional passages or wires or cables.

The one or more knockouts can be arranged either flush, recessed or projected relative to the surface of the scoop.

The one or more knockouts can be located on any side of the scoop or at the portion generally opposite to the scoop opening.

The one or more knockouts can be manufactured integral with the scoop, or can be manufactured separate from the scoop.

The scoop and knockouts are made from plastic, resin or metal.

Thus, it is an object of this invention to provide a versatile scoop and wall plate for mounting to a wall for routing cable or wires where an additional opening is available to the installer in the form of a knockout.

Other objects, features and advantages of the present invention will become apparent upon reading the following specification, when taken in conjunction with the accompanying drawings.

DETAILED DESCRIPTION

Figure 1:
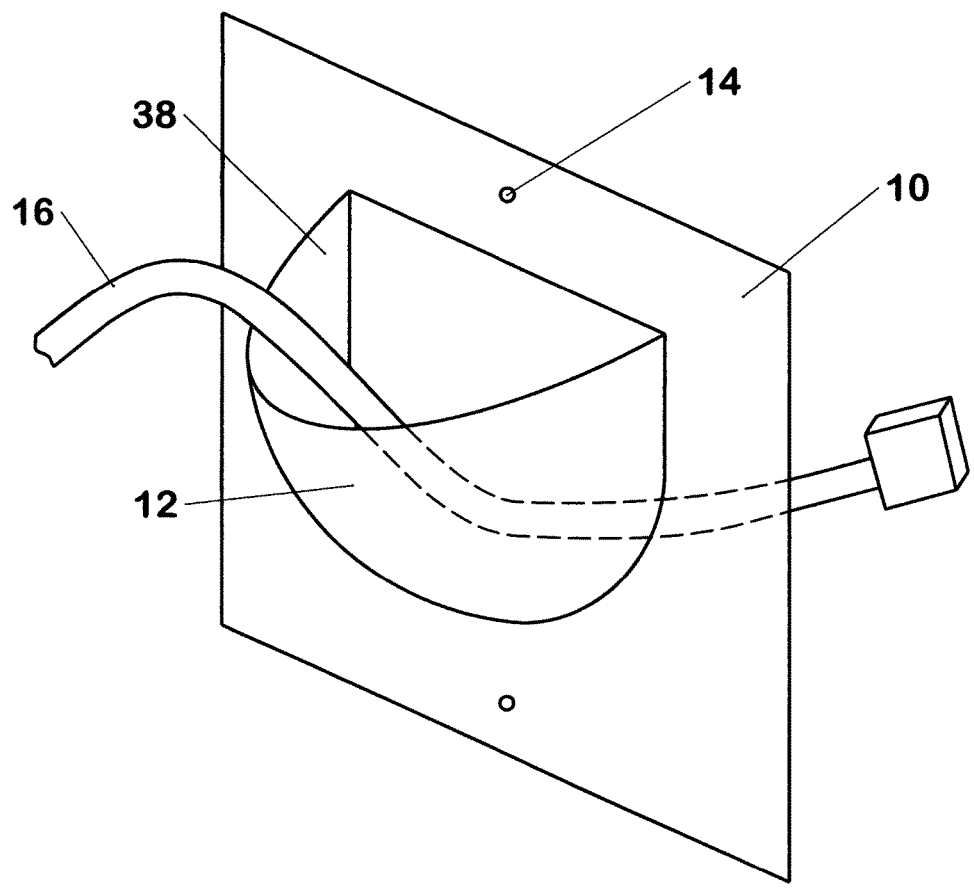
FIG. 1 is a view of the wall plate and scoop of the prior art.

Referring now in more detail to the drawings, in which like numerals indicate like parts throughout the several views, FIG. 1 illustrates a prior art wall plate having a support plate 10 and a scoop 12 mounted to the wall plate. A support bracket or box (not illustrated) is either fixed to a wall stud or clamped onto a wall opening, depending on the particular installation. Generally, in 'new construction' applications, boxes or support frames are fastened to wall studs to define the openings for cables or wires. In 'old construction,' boxes or frames are clamped to an existing wall opening. Both applications permit the routing of wires 16 from behind the wall to equipment within the walled room by passage through a scoop opening 38. The wall plate is fasted to the support frame or box with the use of fasteners extending through holes 14. The wall plate functions to provide a more aesthetically pleasing appearance to the hole in the wall. The scoop 12 adds the additionally aesthetic property of concealing the cavity behind the hole in the wall by the particular shape of the scoop, which is well understood and documented in the prior art.

Figure 2:
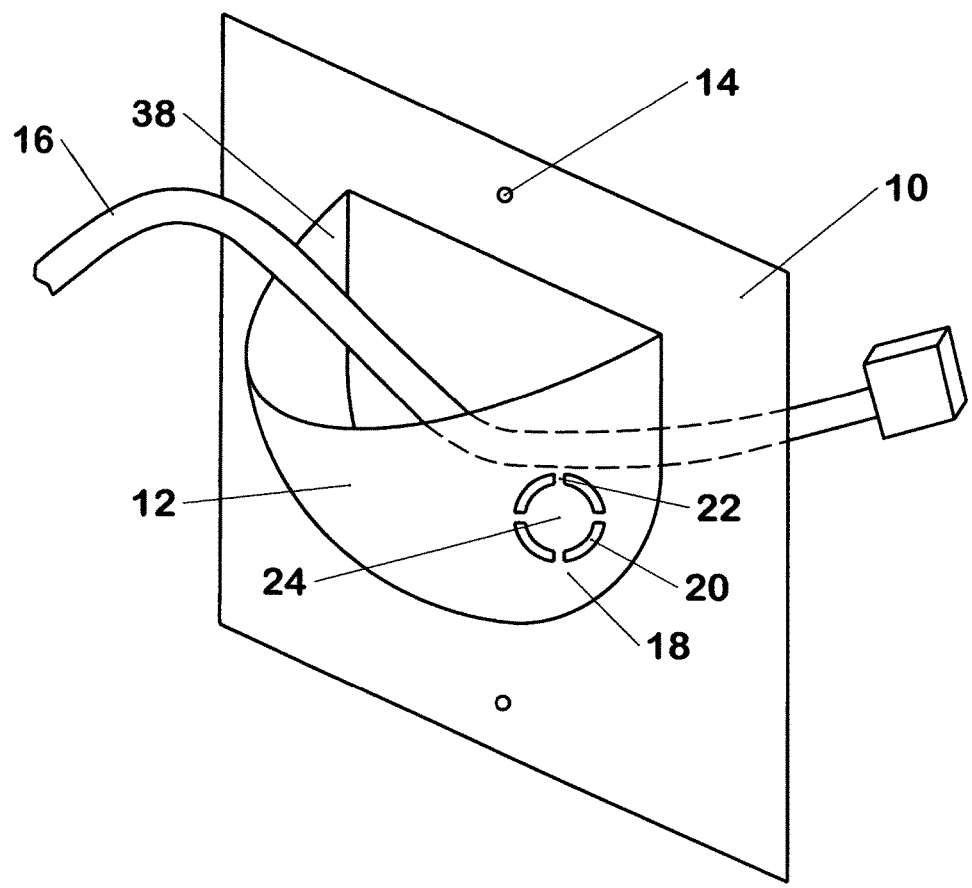
FIG. 2 is a view of the wall plate of FIG. 1, showing the addition of a knockout.

FIG. 2 shows the improved wall plate having an illustrative knockout 18 on the scoop. Knockouts are well-known in the art of electrical boxes which allow for selective openings into the electrical box for the routing of cable or wires. The structure of the knockout is a weakened or a thinner portion of material defining the shape of the knockout. Alternatively, the knockout is defined by an annular cut-out 20, with ribs 22 segmenting the annular cutout and joining a knockout center portion 24 to the surface of the body of the scoop 12. Traditionally, a knockout is "punched out" from the box by an installer on site to form an opening where a clamp is then used to allow a cable or wire to pass into the electrical box and become fixed thereto. Here, the use of a clamp is optional with the inventive wall plate and scoop since typically only low voltage cables or wires are routed through the scoop 12. However, the invention is capable of being used with clamps since the sizes of the knockouts can be substantially similar to those of well-known electrical boxes, and the addition of the clamps provides a more secure installation of the cable or wires.

Figure 3:
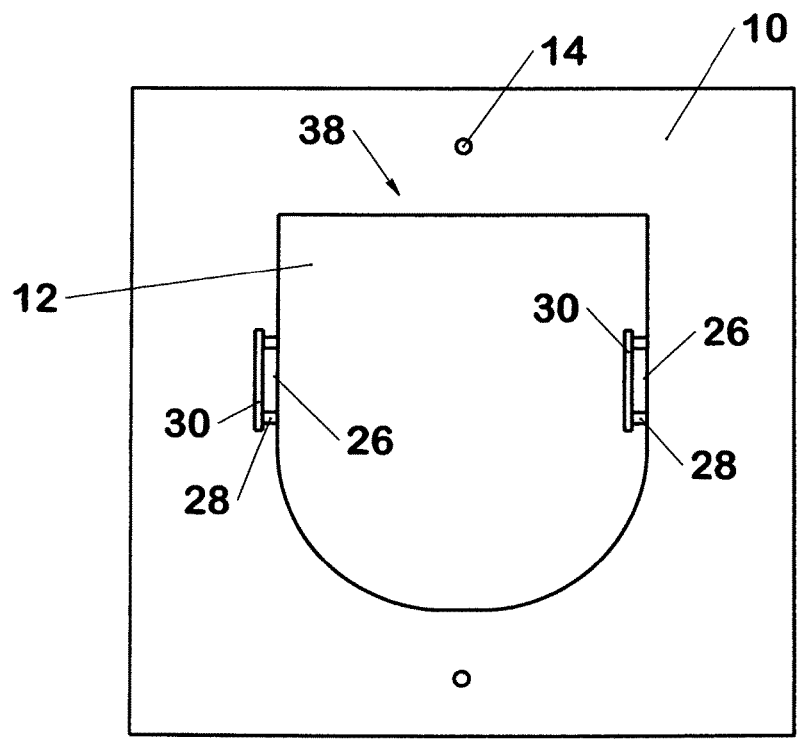
FIG. 3 is a view of the wall plate and scoop having projected and recessed knockouts.
Figure 4:
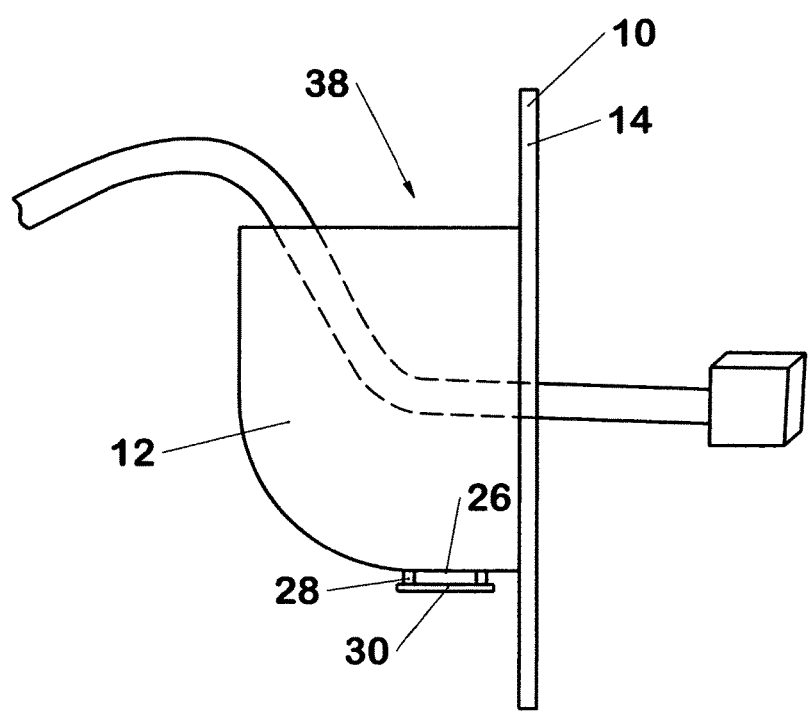
FIG. 4 is a side view of the wall plate and scoop assembly, showing a knockout on the scoop opposing the scoop opening.

The knockout 18 can be located in any one of a number of positions. FIG. 2 shows the knockout 18 on one side of the scoop 12. FIG. 3 shows knockouts 30 on either or both sides of the scoop, while FIG. 4 shows a knockout 30 on the bottom of the scoop. Any or all of the different embodiments may be selectively combined to have anywhere from at least one knockout to three or more knockouts arranged on the scoop.

The knockouts may be formed flush with the surface of the scoop, or alternatively be recessed from the surface of the scoop as depicted in the right half side FIG. 3A, or projected from the surface of the scoop as depicted in the left half side of FIG. 3A. To form the knockouts of FIG. 3A, 3B and FIG. 4, a hole 26 is formed in the surface of the scoop 12 and one or more rib 28 extends out or extends in from the scoop surface 12, and finally, a knockout 30 is connected to the one or more ribs 28.

Figure 5:
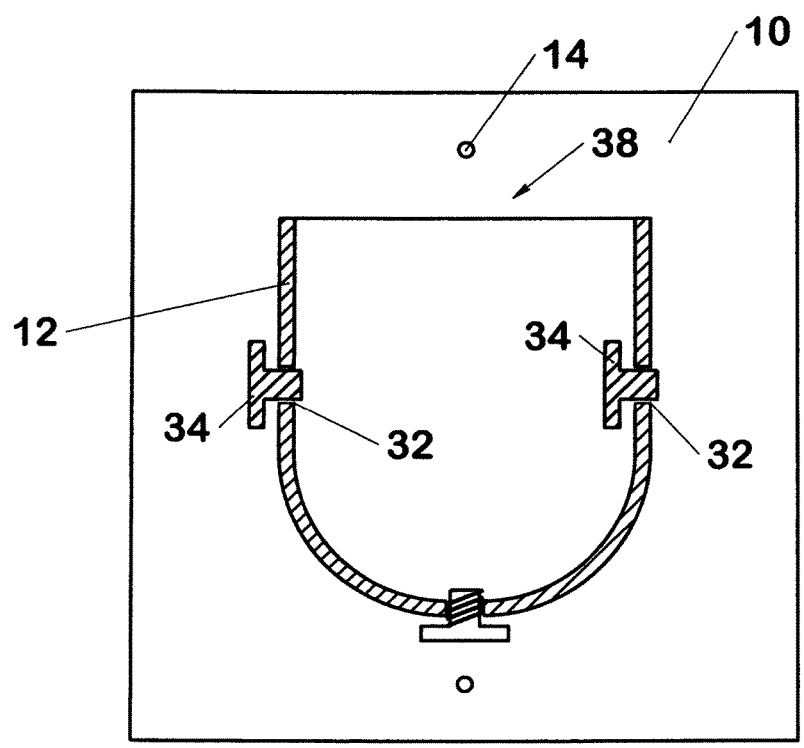
FIG. 5 is a view of the wall plate and scoop having plug knockouts.

FIG. 5 shows an embodiment where the knockout is formed as a plug 34 which is formed to fit within an hole 32 in the scoop 12. In this embodiment, the plug 34 is removable from the scoop 12 by hand or with a tool, and can be replaced into the hole 32. The hole 32 and plug 34 are sized so that the plug 34 may be inserted and removed from either the inside or the outside of the scoop 12. A thread 36 may be used on the plug 34 to assist in the engagement between the plug 34 and the hole 32. The hole 32 may be formed with a cooperating thread; otherwise the wall surface that forms the hole 32 may function as the cooperating surface of the plug thread 36 for reducing the cost of the manufacture of the assembly.

In manufacturing the wall plate 10, scoop 12 and at least one knockout 18, 30, 34, plastic is advantageously used for its durability, cost and multiple color variation capabilities. Although a metal or resin material may be alternatively used.

I claim:

1. A scoop which is used on a wall plate for the routing of electrical cable or wires through a wall opening;
   said scoop having an opening for receiving electrical cable or wire, and a surface for guiding the electrical cable or wires from said opening to said wall opening;
   said surface for guiding the electrical cable or wires from said opening to said wall opening visually blocking a line of sight from said wall opening;
   said surface having at least one predetermined knockout;
   said knockout being frangible or removable with respect to said surface to form a second opening for receiving electrical cable or wire; and
   said second opening allowing for the routing of electrical cable or wire through said wall opening.

2. The scoop of claim 1, wherein the at least one knockout is flush with the surface of the scoop.

3. The scoop of claim 1, wherein the at least one knockout is recessed with respect to the surface of the scoop.

4. The scoop of claim 1, wherein the at least one knockout projects from the surface of the scoop.

5. The scoop claim 1, wherein the at least one knockout is on the bottom of the scoop, substantially opposed to the scoop opening.

6. The scoop of claim 1, wherein the at least one knockout is made integral with the scoop.

7. The scoop of claim 1, wherein the at least one knockout is made separate from the scoop and configured to be selectively fit into a cooperating hole in the scoop as a plug.

8. The scoop of claim 7, wherein the knockout has a thread on a portion which is capable of engagement with the scoop hole.

9. The scoop of claim 8, wherein the hole in the scoop has a cooperating thread for mating engagement with the thread of the knockout.

10. The scoop of claim 1, wherein the scoop and at least one knockout are plastic.

11. A wall plate which is used on a wall for the routing of electrical cable or wires through a wall opening, the wall plate having one or more openings for the passage of screws;
    the wall plate further having:
    a scoop;
    the scoop having:
    an opening for receiving electrical cable or wire, and a surface for guiding the electrical cable or wires from said opening to said wall opening;
    said surface for guiding the electrical cable or wires from said opening to said wall opening visually blocking a line of sight from said wall opening;
    said surface having at least one predetermined knockout;
    said knockout being frangible or removable with respect to said surface to form a second opening for receiving electrical cable or wire; and
    said second opening allowing for the routing of electrical cable or wire through said wall opening.

12. The wall plate of claim 11, wherein the at least one knockout is flush with the surface of the scoop.

13. The wall plate of claim 11, wherein the at least one knockout is recessed with respect to the surface of the scoop.

14. The wall plate of claim 11, wherein the at least one knockout projects from the surface of the scoop.

15. The wall plate claim 11, wherein the at least one knockout is on the bottom of the scoop, substantially opposed to the scoop opening.

16. The wall plate of claim 11, wherein the at least one knockout is made integral with the scoop.

17. The wall plate of claim 11, wherein the at least one knockout is made separate from the scoop and configured to be selectively fit into a cooperating hole in the scoop as a plug.

18. The wall plate of claim 17, wherein the knockout has a thread on a portion which is capable of engagement with the scoop hole.

19. The wall plate of claim 18, wherein the hole in the scoop has a cooperating thread for mating engagement with the thread of the knockout.

20. The wall plate of claim 11, wherein the wall plate, scoop and at least one knockout are plastic.

* * * * *